United States Patent [19]

Kammersgard et al.

[11] Patent Number: 5,400,470

[45] Date of Patent: Mar. 28, 1995

[54] SELF-CAPTURING ARTICULATING CHEST HANDLE

[75] Inventors: Dana W. Kammersgard, Vista; Angus R. Colson, Jr., Jamul, both of Calif.

[73] Assignee: Artecon, Carlsbad, Calif.

[21] Appl. No.: 179,082

[22] Filed: Jan. 10, 1994

[51] Int. Cl.[6] .................. A45C 13/26; A47B 95/02
[52] U.S. Cl. ............................... 16/112; 16/126; 190/39; 220/763
[58] Field of Search ............ 16/112, 115, 126; 190/39, 117; 220/763

[56] References Cited

U.S. PATENT DOCUMENTS

| | | | |
|---|---|---|---|
| 3,082,473 | 3/1963 | West | 220/763 |
| 5,068,944 | 12/1991 | Knurr | 16/112 |
| 5,160,075 | 11/1992 | Moscovitch | 16/112 |

Primary Examiner—Lowell A. Larson
Assistant Examiner—Donald M. Gurley
Attorney, Agent, or Firm—John J. Murphey

[57] ABSTRACT

A self-capturing articulating chest handle including a handle bar of terminal length containing a hand grasping portion, a pair of legs extending downward from the terminal ends of the handle bar, a pair of links, defined by spaced-apart first and second ends, pivotally attached at the first ends to the terminal ends of the legs, outboard thereof, to allow the handle to be swung thereabout, a bracket for mounting against a vertical surface including a pair of mutually spaced-apart ears extending outward therefrom, a first device for pivotally inter-connecting the second link ends to the ears and including an extended element located inboard from the connection interior the links, and a second device formed in the handle bar for fastenable receipt therein of the extended element when the handle is swung downward from a carrying position and rotated about the links into overlapping arrangement therewith and the folded handle legs and links swung further downward against the vertical surface.

20 Claims, 1 Drawing Sheet

SELF-CAPTURING ARTICULATING CHEST HANDLE

BACKGROUND OF THE INVENTION

1. Field of the Invention

This invention pertains to a field of handles. More particularly, it pertains to the field of chest-type handles and to a novel handle that is foldable to a small, compact configuration that holds itself in its folded state without the use of springs, straps, etc.

2. Description of the Prior Art

All large and heavy objects and boxes are cumbersome and difficult to handle without the aid of handles. Handles allow the items to be grasped by the hand and lifted and moved with ease. However, once the item has been moved into its desired position, the handles become somewhat extraneous and, if not placed out of the way, they become an annoyance and, more importantly, may become a personal hazard.

For instance, when loading luggage into the back of the family car, in preparation for a vacation, the suitcases are easily lifted by their handles and placed in the trunk. As more luggage is loaded and the suitcases are pushed closer and closer together and turned on their sides, the handles on the luggage previously loaded become obstacles to further loading. More importantly, these handles catch fingers and fingernails of the loader and may cause physical injury if care is not taken.

In the computer field, there is a movement towards stacking computer equipment in racks, one unit on top of another, and interconnecting them to achieve more computing power without a great sacrifice in floor space or bench space. The computers are usually carried in racks and on rails similar to the rails that support drawers in filing cabinets so that they may be pulled out for interconnection and repair and pushed back in for operation.

These computer units are large, often measuring 28 inches by 28 inches and 6 to 8 inches high and weigh upwards of 30 pounds or more. Just like luggage, they require handles for ease in manipulation. While front mounted handles are provided to pull and push the units on the rails, other handles are required to lift the units out of the rails for repair and/or replacement and back into the rails for restacking and operation.

There are constraints upon the type, size and location of handles usable in computer racks. They are usually of the chest type, i.e. they mount to the vertical side wall of the unit as opposed to being mounted on the top surface so that other units may be stacked on top of them without interference from the handles. They need to be of a size sufficient to carry all the weight of the unit, usually one handle on Opposite sides of the computer unit, so that it is stabilized while being lifted or lowered. In addition, it should be full size so that it may be gripped with the whole hand; these computer units are quite expensive and the handles need to be quite strong in order to prevent them from falling and breaking.

The handle should be designed to fold away when not in use so that it will not interfere with moving the unit in and out along the rails. This compactness also should be achieved without the use of springs, wires or straps as they have been known to break loose and penetrate an opening in the computer housing and short circuit the interior components. Finally, the handles should be manufactured at a low cost so as to maintain the competitive nature of their use in the racking system.

SUMMARY OF THE INVENTION

This invention is a novel handle for specific use with computer units that are racked as hereinbefore described. The handle may also be used with other luggage-type units as well as anywhere else a small, compact, chest-type handle is desired. The handle comprises a handle bar with short legs extending therefrom, a pair of links pivotally attached to the legs, and a special bracket that accepts the handle bar and links in folded configuration after the bar is swung about its pivot points and folded back on itself. As the entire unit closes, it captures itself in such a manner as to hold itself in this small configuration without the aid of springs or wires. Much of the unit may be made of extruded material so that the overall cost of manufacture is kept to a minimum.

Accordingly, the main object of this invention is a handle for use in small areas that may be unfolded to full size for use and later folded and stored away without the use of wires, springs, straps or other like devices of the prior art. Other objects of the invention include a handle that can lift large weights, yet be foldable to a compact size for storing; a handle that may be mounted in a small, out-of-the-way place; a handle that may be unfolded for use and refolded for storage in a confined enclosure; a handle that provides full utilization to lift and move heavy items, yet is foldable to a compact configuration for storage; and, a handle whose main components may be manufactured using low-cost processes to maintain a low overall cost of manufacture.

These and other objects of the invention may be determined by reading the following description of the preferred embodiment taken together with the drawings appended hereto. The protection sought by the inventor may be gleaned from a fair reading of the claims that conclude this specification.

DESCRIPTION OF THE PREFERRED EMBODIMENT

Figure 1:
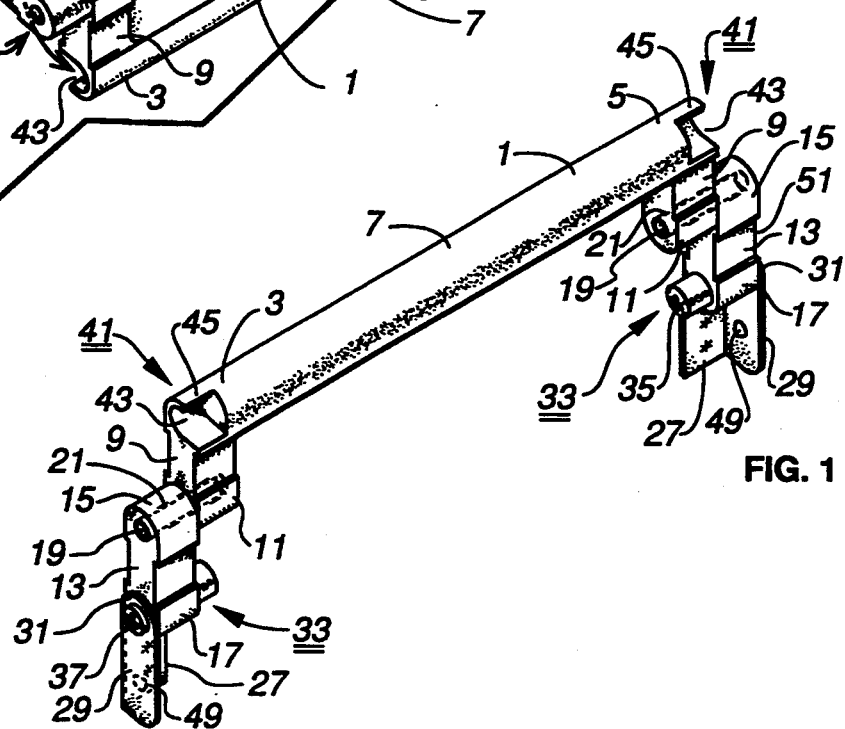
FIG. 1 is a trimetric view of the novel handle of this invention in its fully unfolded configuration, ready for use.

Referring now to the drawings wherein like elements are identified with like numerals throughout the four figures, the unfolded handle of this invention is shown in FIG. 1 to comprise a handle bar 1 terminated by handle bar ends 3 and 5 that include a center hand grasping portion 7. It is preferred that hand grasping portion 7 is straight to facilitate gripping by the hand, however, there may be a need to have it or some other configuration to avoid other items on the computer housing or the slide on which the unit is moved and all of these configurations are fully contemplated herein. As shown, both handle bar 1 and handle grasping portion 7 are straight and in axial alignment and such is the preferred embodiment.

A pair of legs 9 extend downward from handle ends 3 and 5 terminating at distal ends 11. It is preferred that legs 9 be short and straight, however, as noted above, some change in direction may be tolerated to avoid protrusions on the cabinet exterior or to avoid covering up an air vent, etc.

Figure 3:
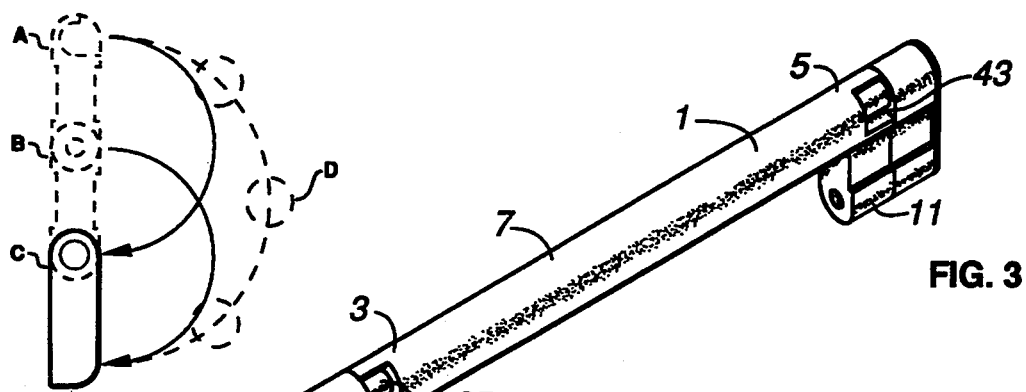
FIG. 3 is a trimetric view of the embodiment shown in FIGS. 1 and 2 in its fully folded away configuration; and, FIG. 4 is a side, schematic view of the folding and unfolding movement of the handle.
Figure 2:
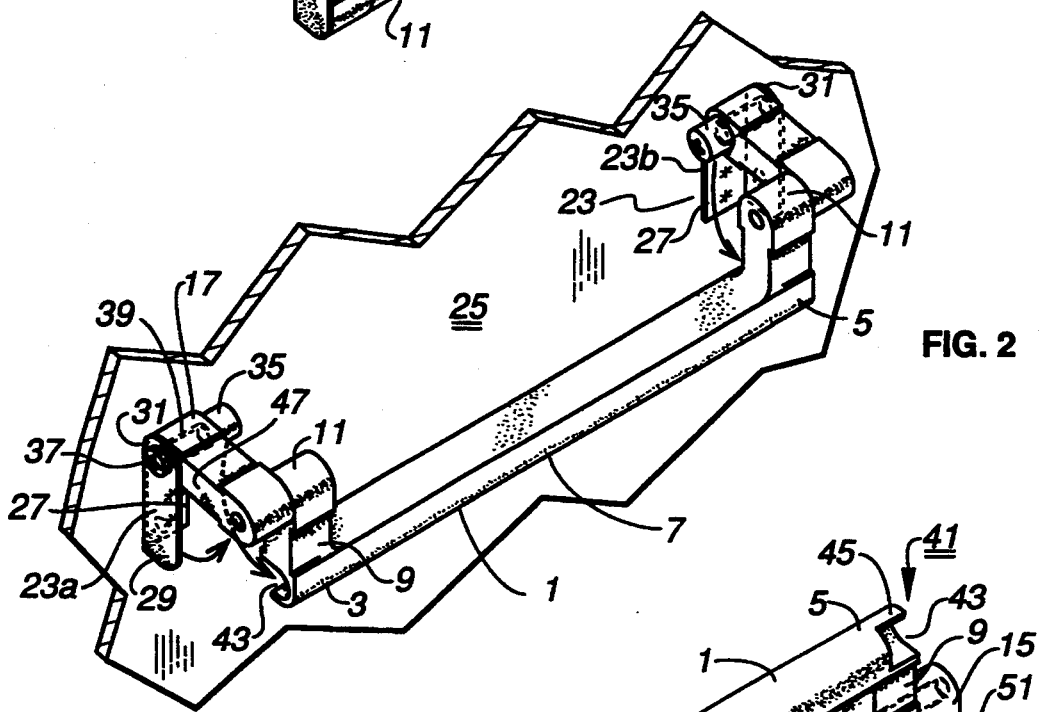
FIG. 2 is a trimetric view of the embodiment shown in FIG. 1 with the handle part way through its folded movement.

A pair of links 13 are next provided that are defined by space-apart first and second ends 15 and 17, respectively. First ends 15 of said links are pivotally attached to leg ends 11, outboard thereof, by pins 19 that are received in aligned cross-bores 21 formed therethrough. In such an arrangement, handle bar 1 may be rotated or articulated about links 13 inboard thereof as shown in FIGS. 2 and 3. It is preferred that links 13 be set at a length that, when folded into overlapping arrangement with legs 9 as shown in FIG. 3, are the same length as legs 9.

A bracket 23, or alternatively a pair of sub-brackets 23a and 23b, are provided for mounting against the vertical side wall 25 or chest of the item to be lifted, hence a "chest" handle. Sub-brackets 23a and 23b are arranged in mutual, spaced-apart position. Bracket 23 is shown in FIG. 2 to comprise a base plate 27, for attaching to sidewall 25 by known means such as riveting, bolting, or wielding, and a sidewall 29 extending outward therefrom preferably perpendicular to or normal to the plane of base plate 27. An ear 31 is formed on the upper end of sidewall 29 such that, when sub-brackets 23a and 23b are set in spaced-apart arrangement, links 13 may be captured therebetween.

First means 33 is provided for pivotally interconnecting second end 17 of links 13 inside ears 31 and provide for an element 35 extending inward from the interconnection. As shown in FIGS. 1 and 2, means 33 comprises pins 37 passing through aligned cross-bores 39 formed respectively in ears 31 and links second end 17. Extended element 35, in this case are round machine heads attached to pins 37. Other types of means 33 are usable herein such as rivets and rivet heads, bolts and bolt heads, machine screws and screw heads, and shoulder screws and all of these are fully contemplated within the scope and spirit of this invention.

Second means 41 is provided to capture extended element 35 for fastenable receipt to hold the handle in its fully folded configuration without the aid of springs or wires, etc. As shown in FIGS. 1, 2 and 3, the preferred form of means 41 comprises a cavity 43 formed in handle ends 3 and 5 above legs 9 that are also above or outboard of hand grasping portion 7 so as not to cause injury when lifting an item to which it is attached. Cavity 43 is designed to receive extended element 35 therein when handle bar 1 is swung downward, from its carrying position shown in FIG. 1, articulated or rotated about links 13 as shown in FIG. 2, into overlapping engagement with links 13 as shown in FIG. 3 and folded legs 9 and links 13 swung further downward against vertical wall 25. While said cavity may take on a number of geometric designs, it is preferred that it take the form of said extended element, i.e., a rounded cavity of the size and shape of said element.

A lip 45 is formed about cavity 43 and arranged to roll into surface contact with extended element 35, during the folding step between that shown in FIGS. 2 and 3, and extend slightly over the top of extended portion 35 in the fully folded configuration shown in FIG. 3. This holds the handle in its folded configuration by the weight of the components and without springs, wires and the like. Other mechanisms are possible, such as a spring loaded arm extending into cavity 43 to contact and ride up over the top of extended element 35, and such is fully incorporated in this invention.

Bracket sidewalls 29 may be conveniently raised and extended outward and downward so that they cover the exterior side 47 of link 13. Handle 1 and links 13 may be conveniently made by metal extrusion techniques. The extrusion may be cut cross-wise to make links 13 and the underside of handle bar 1 cut away to provide a unitary handle and legs 9. The underside of handle grasping portion 7 may be thereafter chamfered to provide comfort in lifting the object.

Optionally, a small convex portion or detent 49 is formed in sub-bracket sidewall 29 as shown in FIG. 1 extending inward as shown. It is arranged to contact outer sidewall 51 of links 13 in a friction-fit manner to aid in retaining handle 1 in its fully folded configuration.

Figure 4:
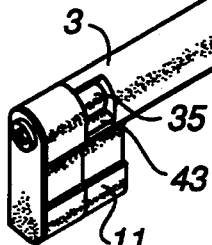

FIG. 4 shows in schematic diagram the movement of handle bar 1 from its open position A, shown in dotted outline, through its intermediate folded position B, also shown in dotted outline, to its fully folded down storage position C, shown in hard line. The novel construction of this design allows the folding and unfolding to be accomplished in a narrower width than a conventional hinged handle whose swing portion is shown in dotted outline labeled D.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the way to achieve substantially the same result are within the scope of this invention.

What is claimed is:

1. A self-capturing articulating chest handle comprising:
   a) a handle bar of terminal length containing a hand grasping portion;
   b) a pair of legs extending downward from the terminal ends of said handle bar;
   c) a pair of links, defined by spaced-apart first and second ends, pivotally attached at said first ends to the terminal ends of said legs, outboard thereof, to allow said handle to be swung thereabout;
   d) a bracket for mounting against a vertical surface including a pair of mutually spaced-apart ears extending outward therefrom;
   e) first means for pivotally interconnecting said second link ends to said ears and including an extended element located inboard from said connection interior said links; and,
   f) second means formed in said handle bar for fastenable receipt therein of said extended element when said handle is swung downward from a carrying position and rotated about said links into overlapping arrangement therewith and said folded handle legs and links swung further downward against the vertical surface.

2. The handle of claim 1 wherein said hand grasping portion of said handle is straight.

3. The handle of claim 1 wherein said handle and hand grasping portions are mutual straight and axially aligned.

4. The handle of claim 1 wherein said handle has a chamfered bottom surface formed thereon.

5. The handle of claim 1 wherein said legs are straight.

6. The handle of claim 1 wherein said links, when folded into overlapping arrangement with said legs, are the same length as said legs.

7. The handle of claim 1 wherein said bracket is divided into two sub-brackets, each sub-bracket having one of said ears formed thereon.

8. The handle of claim 7 further including a sidewall formed on each sub-bracket and extending outward and downward from said ears to cover said link in its folded configuration.

9. The handle of claim 1 wherein said first means includes a rivet connection and said extended element includes a rivet head.

10. The handle of claim 1 wherein said first means includes a bolted connection and said extended element includes a bolt head.

11. The handle of claim 1 wherein said extended element is rounded and said cavity means includes a rounded cavity of the size and shape of said element.

12. The handle of claim 11 further including a lip, formed on said handle adjacent said cavity means, extending over the top of said cavity means to aid in the capture of said handle in its closed configuration.

13. The handle of claim 11 wherein said leg ends, said link ends, and the upper surface of said handle are mutually rounded to form a smooth, compact configuration in the folded configuration.

14. The handle of claim 11 further including a convex element extending inward from said bracket sidewall to frictionally engage said links to aid in retaining said handle in its folded configuration.

15. A self-capturing articulating chest handle comprising:
a) a handle bar of terminal length, containing a hand grasping portion centrally thereof, where both are straight and axially aligned;
b) a pair of straight legs extending downward from the terminal ends of said handle bar;
c) a pair of links, defined by spaced-apart first and second ends, of a length when folded into overlapping arrangement with said legs, are the same length as said legs, pivotally attached at said first ends to the terminal ends of said legs, outboard thereof, to allow said handle to be swung thereabout;
d) a pair of sub-brackets, arranged in mutual, spaced-apart position, for mounting against a vertical surface including a pair of mutually spaced-apart ears extending outward therefrom;
e) first means for pivotally interconnecting said second link ends to said ears and including an extended element located inboard from said connection interior said links; and,
f) second means formed in said handle bar for fastenable receipt therein of said extended element when said handle is swung downward from a carrying position and rotated about said links into overlapping arrangement therewith and said folded handle legs and links swung further downward against the vertical surface.

16. The handle of claim 15 further including a sidewall formed on each sub-bracket and extending outward and downward from said ears to cover said link in its folded configuration.

17. The handle of claim 15 wherein said extended element is rounded and said cavity means includes a rounded cavity of the size and shape of said element.

18. The handle of claim 15 further including a convex element extending inward from said bracket sidewall to frictionally engage said links to aid in retaining said handle in its folded configuration.

19. The handle of claim 15 further including a lip, formed on said handle adjacent said cavity means, extending over the top of said cavity means to aid in the capture of said handle in its closed configuration.

20. A self-capturing articulating chest handle comprising:
a) a handle bar of terminal length, containing a hand grasping portion centrally thereof, where both are straight and axially aligned;
b) a pair of straight legs extending downward from the terminal ends of said handle bar;
c) a pair of links, defined by spaced-apart first and second ends, of a length when folded into overlapping arrangement with said legs, are the same length as said legs, pivotally attached at said first ends to the terminal ends of said legs, outboard thereof, to allow said handle to be swung thereabout;
d) a pair of sub-brackets, arranged in mutual, spaced-apart position, for mounting against a vertical surface including a pair of mutually spaced-apart ears extending outward therefrom and further including a sidewall formed on each sub-bracket and extending outward and downward from said ears to cover said link in its folded configuration;
e) first means for pivotally interconnecting said second link ends to said ears and including an extended element located inboard from said connection interior said links wherein said extended element is rounded; and,
f) second means formed in said handle bar for fastenable receipt therein of said extended element when said handle is swung downward from a carrying position and rotated about said links into overlapping arrangement therewith and said folded handle legs and links swung further downward against the vertical surface and said cavity means includes a rounded cavity of the size and shape of said element and further including a lip, formed on said handle adjacent said cavity means, extending over the top of said cavity means to aid in the capture of said handle in its closed configuration.

* * * * *